(12) United States Patent  (10) Patent No.: US 6,299,091 B1
Blackadder et al.  (45) Date of Patent: Oct. 9, 2001

(54) SEAT BELT RETRACTOR SPOOL AND TORSION BAR

(75) Inventors: David Blackadder, Carlisle; Joseph Patrick Harte, Maryport; Alan George Smithson, Carlisle, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/481,634

(22) Filed: Jan. 12, 2000

(30) Foreign Application Priority Data

Jan. 27, 1999 (GB) .................................. 9901734
Feb. 8, 1999 (GB) .................................. 9902576

(51) Int. Cl.$^7$ ................................................ B65H 75/48
(52) U.S. Cl. ........................ 242/379.1; 242/371; 242/379
(58) Field of Search .................... 242/565, 371, 242/379, 379.1

(56) References Cited

U.S. PATENT DOCUMENTS

| 5,820,058 | 10/1998 | Hirzel et al. |  |
|---|---|---|---|
| 5,961,060 | * 10/1999 | Brambilla et al. | 242/379.1 |
| 6,029,924 | * 2/2000 | Ono et al. | 242/379.1 |
| 6,105,893 | * 8/2000 | Schmidt et al. | 242/374 |

* cited by examiner

*Primary Examiner*—Donald P. Walsh
*Assistant Examiner*—Mark J. Beauchaine
(74) *Attorney, Agent, or Firm*—Lonnie Drayer (57) ABSTRACT

A seat belt retractor spool has a spool body with opposed end flanges. A ratchet wheel is arranged on one end flange. A torsion bar is located in a bore in the spool body and is coupled to the ratchet wheel by means of a toothed portion at one end thereof. The other end of the torsion bar has a plurality of radial projections which cooperate with axial protrusions on the end flange to couple the bar 10 to the spool.

18 Claims, 14 Drawing Sheets

SEAT BELT RETRACTOR SPOOL AND TORSION BAR

FIELD OF THE INVENTION

The invention relates to a seat belt retractor spool of the type, which employs a torsion bar to reduce the belt loading on a vehicle occupant in the event of a crash. The invention also relates to a torsion bar for use with the spool.

BACKGROUND OF THE INVENTION

A known seat belt retractor spool comprises a spool body with a bore formed therethrough. A ratchet wheel is arranged on one end of the spool body so as to be rotable relative to the body. A torsion bar is arranged within the spool and comprises an elongate bar having a toothed peripheral surface portion formed adjacent each end of the bar. One of the toothed peripheral surface portions is drivingly engaged with a cooperating toothed surface on an inner part of the ratchet wheel. The other toothed peripheral surface is drivingly engaged with a cooperating toothed surface in the bore at the opposite end of the spool from the ratchet wheel. Thus, under normal circumstances the spool rotates with the ratchet. In the event of a crash, the seat belt retractor locking mechanism locks the ratchet wheel, preventing rotation thereof. As the seat belt begins to pay out further due to the forward motion of the occupant, the spool body is caused to rotate. As the ratchet wheel cannot rotate and the spool body rotates, the torsion bar, which is connected between the spool body and ratchet wheel, is twisted. The torsion bar deforms plastically in torsion. The plastic deformation of the torsion bar reduces the seat belt loading on the occupant, which in turn lessens the chance of the occupant receiving an injury from the seat belt.

A disadvantage of the prior art arrangement is that the torsion bar engages the ratchet wheel and spool body by means of a toothed peripheral surface portion. In view of the forces involved, the toothed portion must take up a substantial length of the torsion bar. That reduces the length of the bar able to be given over to plastic torsion and deformation and this reduces the amount of force that can be taken up by the torsion bar.

SUMMARY OF THE INVENTION

According to a first aspect of the invention there is provided a seat belt retractor spool comprising a spool body having opposite end faces, a ratchet wheel arranged for rotation relative to the spool on one end face of the spool body and a torsion bar coupled to the ratchet wheel, the torsion bar extending through the spool body and having a spool-coupling formation on the end thereof spaced from the ratchet wheel, the end face of the spool body spaced from the ratchet wheel having a cooperating formation for cooperation with the spool-coupling formation on the torsion bar so as to couple the torsion bar to the spool body for rotation therewith.

According to a second aspect of the invention there is provided a torsion bar for a seat belt retractor spool comprising an elongate body having a ratchet wheel coupling formed in a peripheral portion towards one end of the body and a spool-coupling formation comprising a projection projecting transversely from the other end of the body.

According to a third aspect of the invention there is provided a method of manufacturing a torsion bar for a seat belt retractor spool comprising the steps of providing an elongate rod of a suitable torsion bar material, cutting a length of the rod, to form a bar forming a ratchet wheel coupling surface in a peripheral portion of the bar towards one end thereof and forging the other end to form a spool-coupling formation in the form of a projection projecting transversely from said other end of the bar.

According to a fourth aspect of the invention there is provided a method of assembling a torsion bar in accordance with the invention into a seat belt retractor spool in accordance with the invention comprising the steps of inserting a torsion bar in accordance with the invention into a bore in a seat belt retractor spool, which bore is arranged to receive the torsion bar, the inserting step comprising inserting the end of the bar which includes the ratchet wheel coupling into the bore at the end of the spool spaced from the end which receives the ratchet wheel, coupling the spool-coupling formation on the bar with the cooperating formation on the end face of the spool, coupling the ratchet wheel coupling surface on the bar with the ratchet wheel, whereby part of the end of the bar protrudes from the ratchet wheel, and working the protruding end of the bar to form and end cap to retain the bar in the spool.

DETAILED DESCRIPTION OF THE INVENTION

Figure 1:
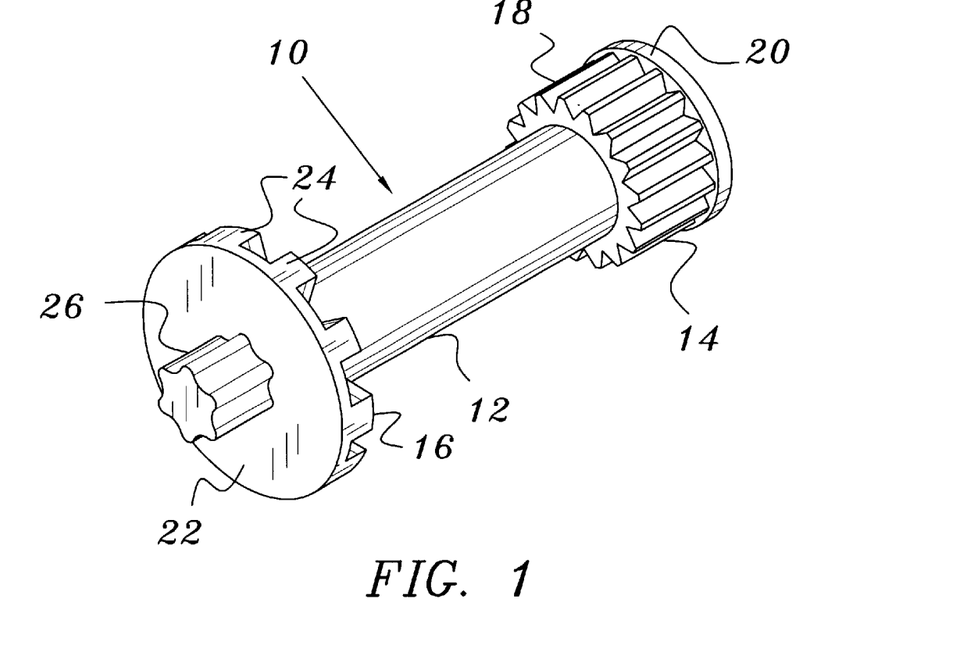
FIG. 1 is a perspective view of a torsion bar in accordance with the invention looking from one end.
Figure 2:
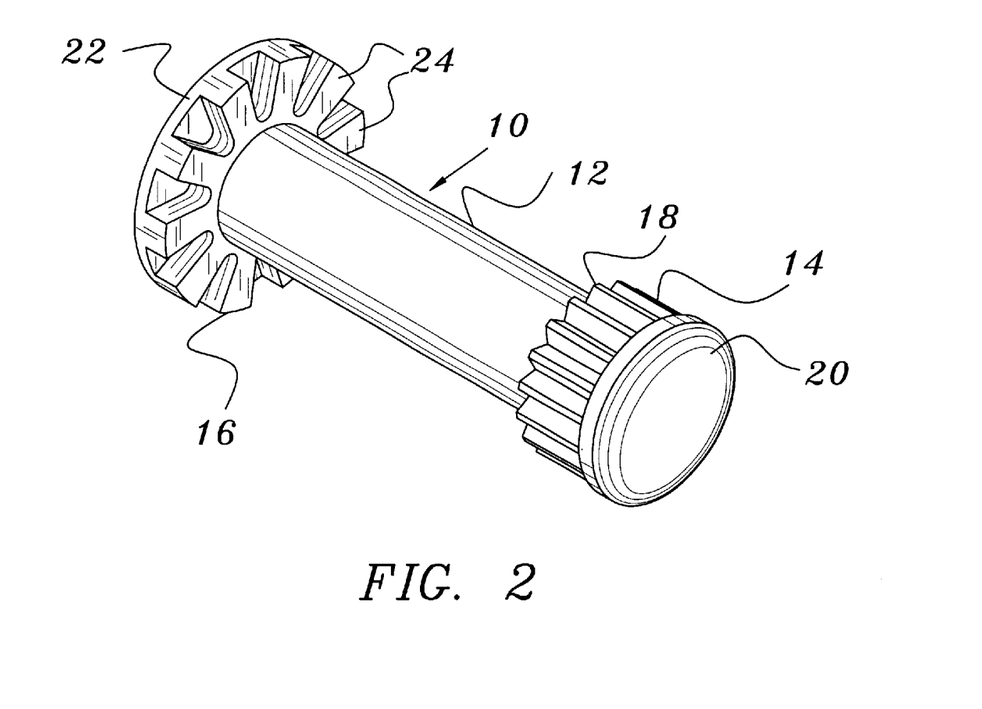
FIG. 2 is a perspective view of the torsion bar of FIG. 1 looking from the other end.
Figures 3, 4:
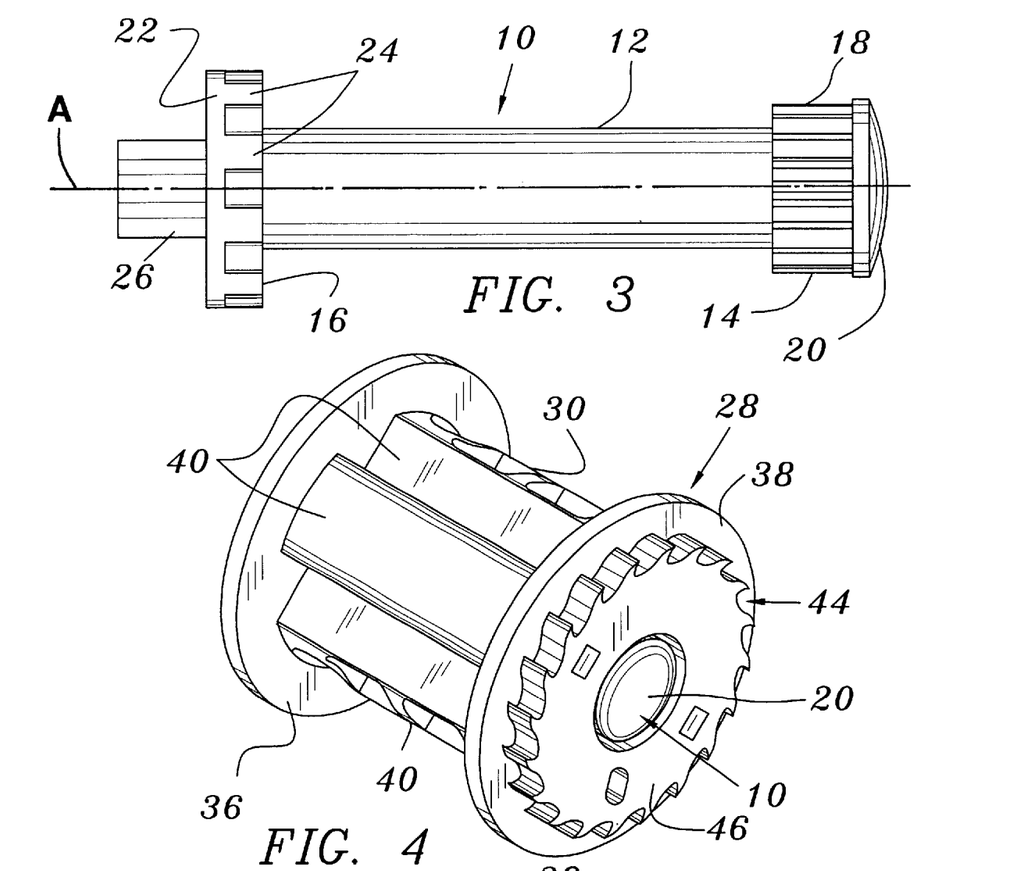
FIG. 3 is a side elevation of the torsion bar of FIGS. 1 and 2.
FIG. 4 is a perspective view of a seat belt retractor spool in accordance with the invention including the torsion bar of FIG. 1 to 3.

In FIGS. 1 to 3 a torsion bar 10 is shown in perspective looking from opposite ends. The torsion bar 10 comprises an elongate body 12 having a ratchet-coupling end 14 and a spool-coupling end 16.

The elongate body 12 of the torsion bar is cylindrical, although any suitably shaped body could be used. The elongate body 12 of the torsion bar may be made of extruded steel, although any material with suitable rigidity modulus, torsional strength and ductility may be used.

The ratchet-coupling end 14 comprises a toothed portion 18 formed about the peripheral surface of the cylindrical body 12. An end cap 20 formed by orbital riveting of the end most part of the toothed portion 18 is provided at the end of the ratchet-coupling end 14.

The spool-coupling end 16 comprises a disc shaped base part 22 with ten radial projections 24 formed on the surface of the base part 22. The disc shaped base part 22 has a diameter, which is greater than the diameter of the body 12 and of the toothed portion 18. The radial projections 24 extend to the peripheral edge of the base 22. The radial projections 24 are regularly spaced about the longitudinal axis A with substantially equal angularity (See FIG. 3) of the torsion bar 10.

A pivot member 26 such as a peg or pin projects axially from the face of the disc-like base 22, which faces away from the body 12.

Figure 5:
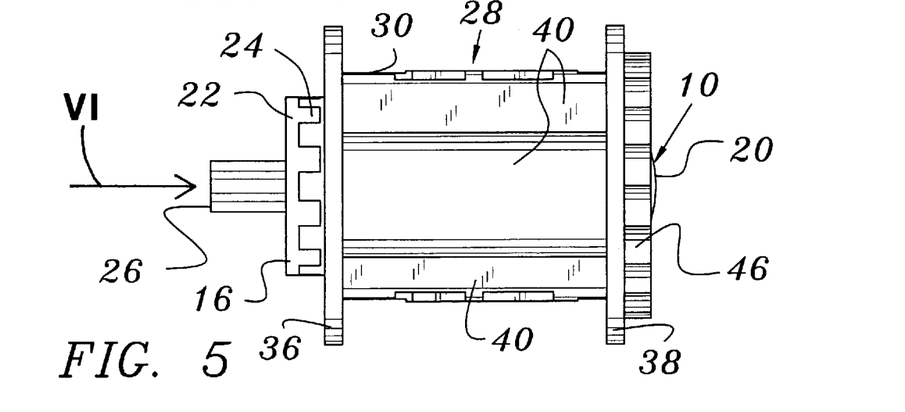
FIG. 5 is a side elevation of the spool of FIG. 4.

The torsion bar 10 of FIGS. 1 to 3 is shown assembled in a seat belt retractor spool in accordance with the invention in FIGS. 4 and 5.

In FIGS. 4 to 9 a seat belt retractor spool 28 in accordance with the invention comprises a spool body 30. The spool body 30 comprises a substantially cylindrical main body part 32 having an axial bore 34 formed therethrough. End flanges 36, 38 are formed at opposite ends of the main body part 32. A seat belt retaining assembly 40 is formed around the main body part 32 and will not be described in detail.

Figure 7:
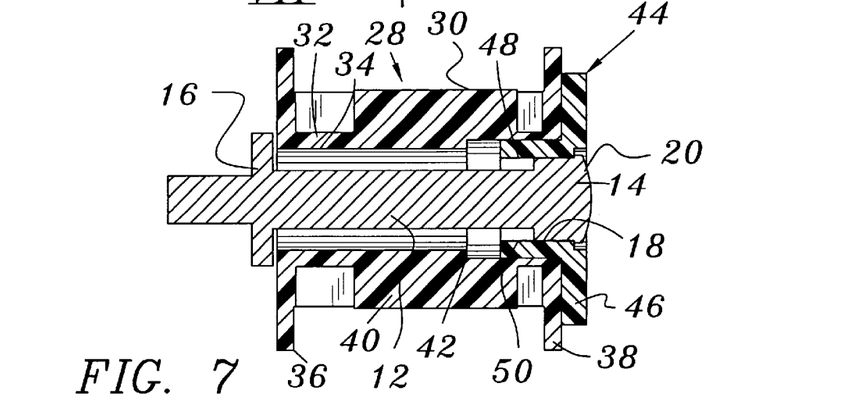
FIG. 7 is a section through the spool of FIG. 6 taken on line VII—VII in FIG. 6 with the torsion bar present.

The bore 34 widens in diameter at a shoulder 42 and tapers outwardly towards an end flange 38.

Figure 6:
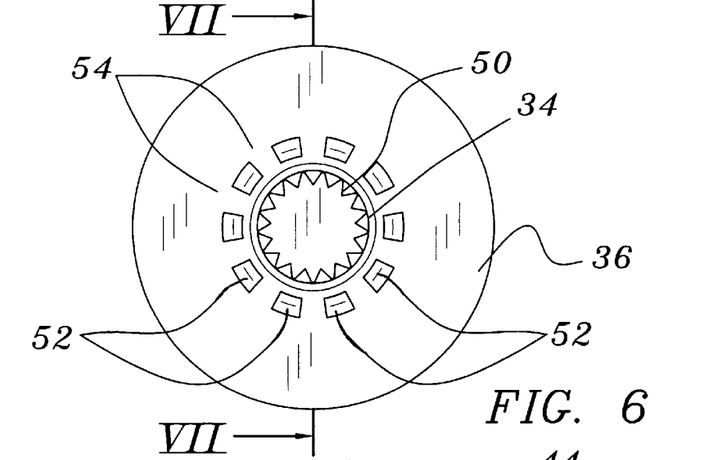
FIG. 6 is an end elevation of the spool of FIG. 5 looking in the direction of arrow VI in FIG. 5 with the torsion bar omitted.

A ratchet wheel 44 is arranged on the end flange 38 of the body 30 of the spool 28. The ratchet wheel 44 comprises a flat disc 46 having a toothed outer periphery and an axially projecting hub 48. A bore 50 is formed axially of the disc 46 and hub 48. The inner surface of the bore 50 is toothed as shown in FIG. 6.

The axially projecting hub 48 of the ratchet wheel 44 is received in the wide part of the bore 34 in the spool body 30. The ratchet wheel 44 is received in such a way that it can rotate relative to the spool when necessary.

Figures 8, 9:
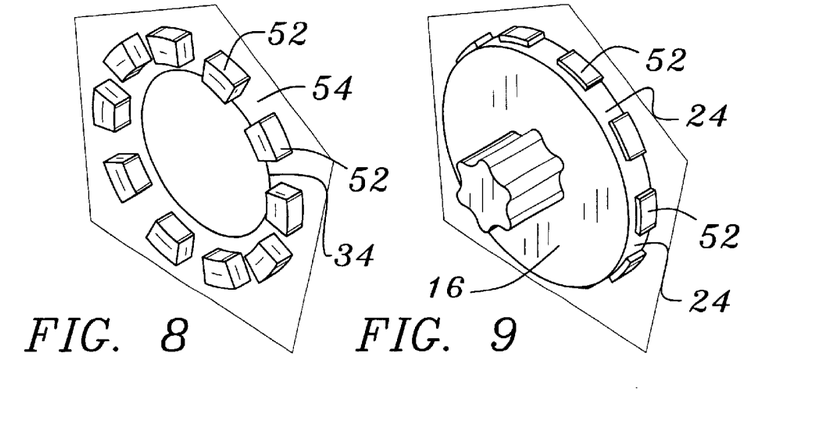
FIG. 8 is a perspective view of part of the end face of the spool of FIG. 4 to 7 with the torsion bar removed.
FIG. 9 is a view similar to FIG. 8 with the torsion bar present.

The opposite end flange 36 has ten axially extending protrusions 52, regularly spaced with substantially equal angularity about the bore 34. The protrusions 52 define spaces 54 therebetween.

As shown in FIGS. 5, 7 and 9, the torsion bar 10 is arranged in the retractor spool 28 so that the toothed portion 18 of the ratchet-coupling 14 engages the toothed inner surface of the bore 50 in the hub 48 of the ratchet wheel 44. Part of the toothed portion 18 protrudes from the bore 50 and the protruding part is deformed to form the end cap 20 by means of orbital riveting.

The radial projections 24 on the disc shaped base 22 are received in the spaces 54 between the axial protrusions 52 on the end flange 36 of the spool 28, as shown most clearly in FIG. 9.

Under normal circumstances the ratchet wheel 44 rotates with the spool 28 as they are interlinked by the torsion bar 10. However, in the event of a rapid deceleration of the vehicle in which the retractor spool is located, for example in a crash, the seat belt retractor locking system locks the ratchet wheel 44 preventing further rotation of the ratchet wheel. The momentum of the vehicle occupant restrained by a seat belt that is connected to the spool 28 carries the vehicle occupant forward causing the seat belt to pay out off the spool. Since the ratchet wheel 44 is constrained and the spool 28 is being forced to rotate, the torsion bar 10 begins to deform in torsion. Under severe loading, as is experienced in a crash, the force on the torsion bar is so great that the torsion bar deforms plastically allowing a further small amount of belt to be paid out from the spool. The plastic deformation of the torsion bar reduces the loading on the chest of the vehicle occupant exerted by the seat belt so as to reduce the chance of an injury being inflicted to the occupant by the belt.

The present embodiment provides a radial projection at the end of the torsion bar and formations on the end face of the spool to couple the spool to the torsion bar allows more of the torsion bar to be given over to torsional deformation than with previous known torsion bars which employ a toothed peripheral portion, as shown at 18 in FIG. 1, at each end. Additionally, since the cooperating formation is on the end face of the spool the radial projections on the torsion bar can have a much larger diameter or length than previous arrangements. That larger diameter provides a greater leverage than with previous arrangements, which reduce the force, applied to the coupling formations. In addition the disc provides a high strength boss to accommodate the large shear loads experienced by the torsion bar when under tensile loading. Furthermore, manufacture of the toothed areas on the torsion bar is expensive and so removal of the requirement for one toothed portion reduces the cost of the assembly.

Figure 10:
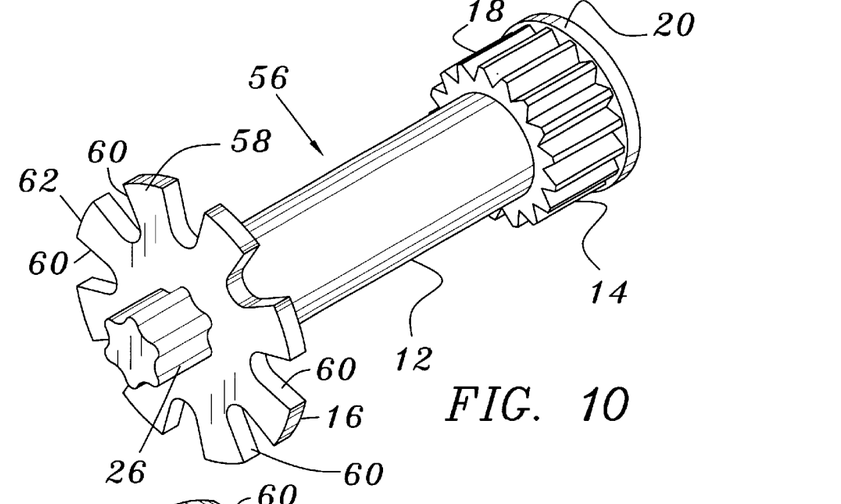
FIG. 10 is a perspective view of a second torsion bar in accordance with the invention looking from one end.
Figure 11:
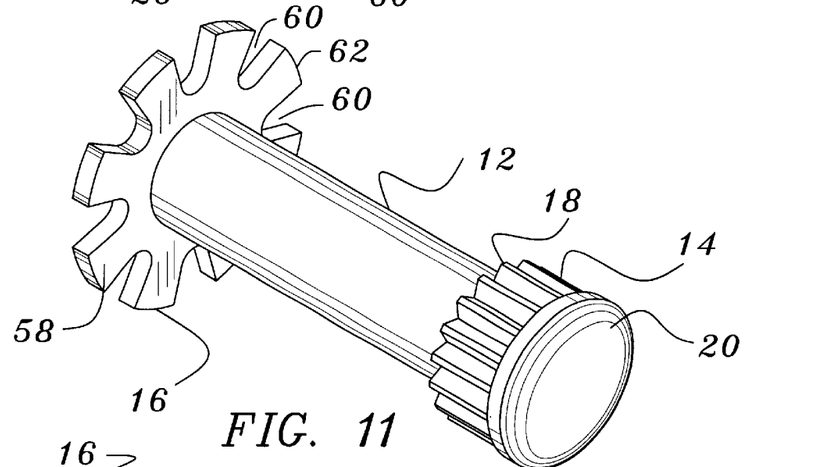
FIG. 11 is a perspective view of the torsion bar of FIG. 10 looking from the other end.
Figure 12:
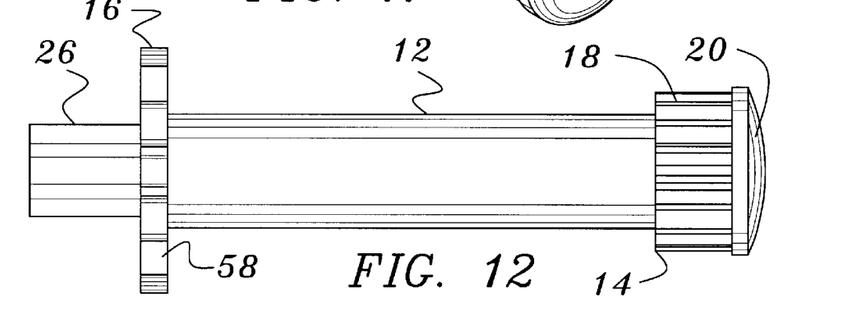
FIG. 12 is a side elevation of the torsion bar of FIGS. 10 and 11.
Figure 13:
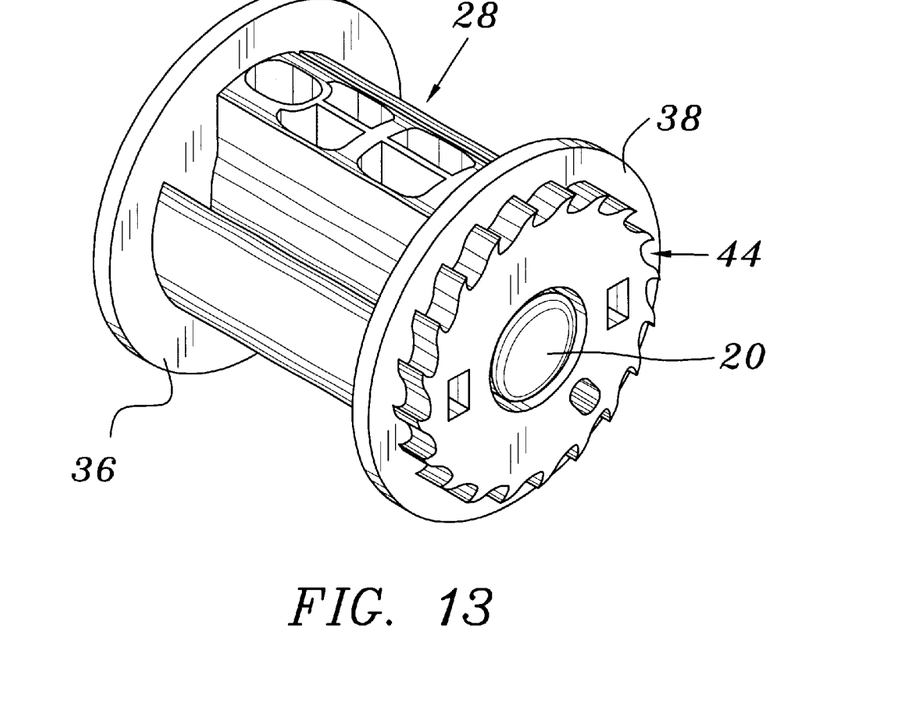
FIG. 13 is a perspective view of a seat belt retractor spool in accordance with the invention including the torsion bar of FIG. 10 to 12.

FIGS. 10 to 12 show a second torsion bar 56 in accordance with the invention. Parts corresponding to parts in FIGS. 1 to 9 carry the same reference numerals. The torsion bar shown in FIGS. 10 to 12 is substantially similar to that shown in FIGS. 1 to 3 so it will not be described in detail.

In FIG. 10 the torsion bar 56 has a body 12 with a ratchet-coupling end 14 and spool-coupling end 16. The ratchet-coupling end 14 is identical to the ratchet-coupling end of the torsion bar 10 of FIGS. 1 to 3.

The torsion-coupling end 16 comprises a disc 58 having a diameter substantially greater than the body 12 and the toothed portion 18 of the ratchet-coupling end 14. The disc 58 has eight cut out portions 60 cut out from the peripheral edge thereof which form between respective cut out portions 60, eight radial projections 62.

Figure 14:
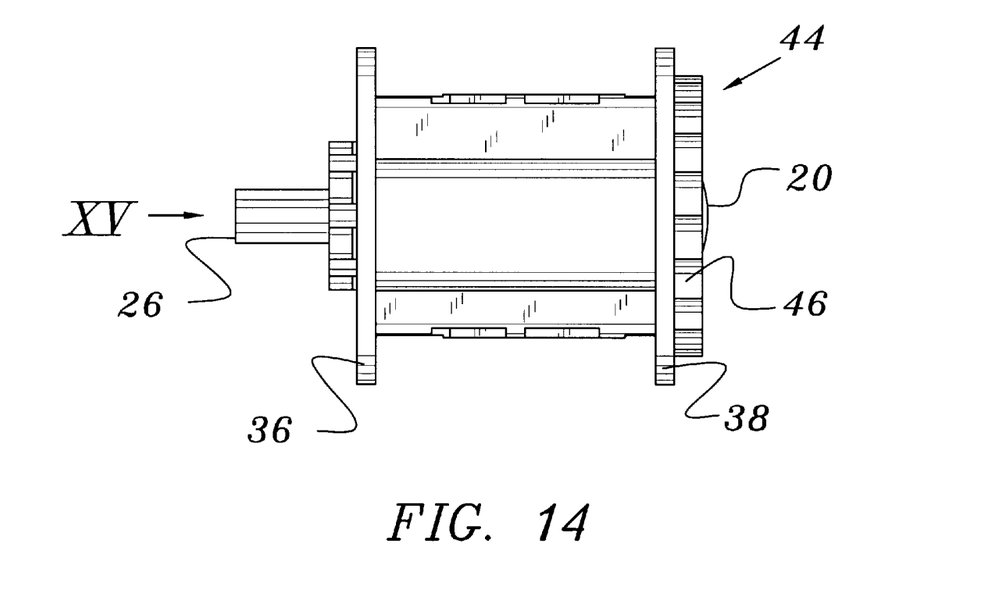
FIG. 14 is a side elevation of the spool of FIG. 13.
Figure 15:
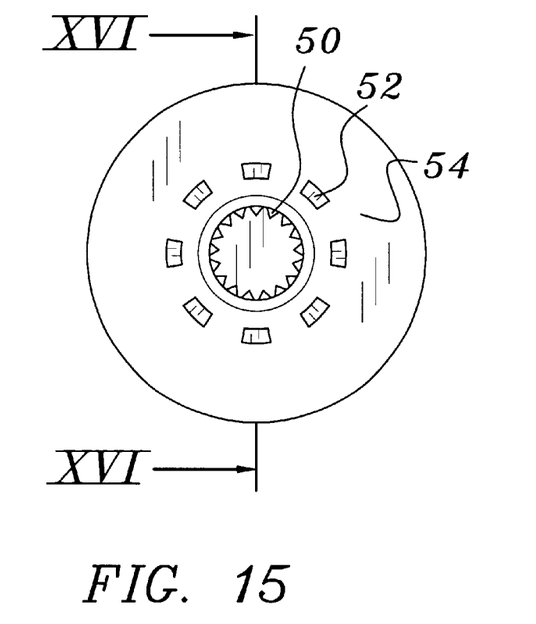
FIG. 15 is an end elevation of the spool of FIGS. 13 and 14 looking in the direction of arrow XV in FIG. 14 with the torsion bar removed.
Figure 16:
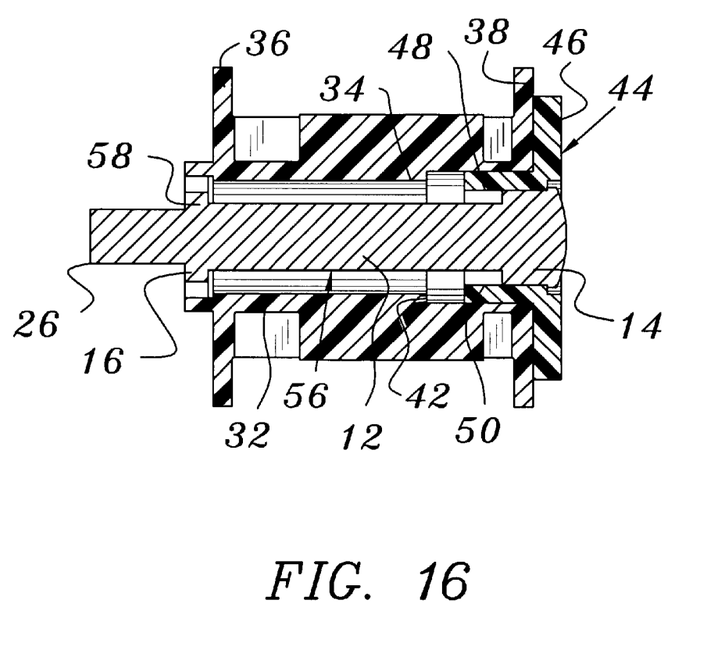
FIG. 16 is a section through the spool of FIGS. 13 to 15 taken on line XVI—XVI in FIG. 15 with the torsion bar present.
Figure 17:
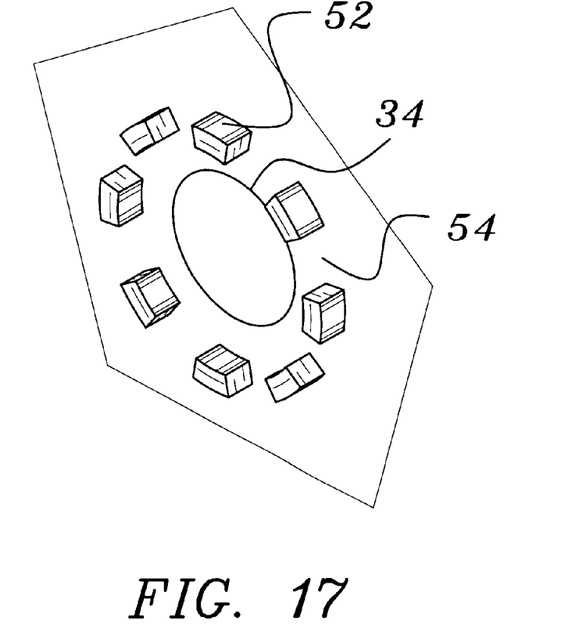
FIG. 17 is a perspective view of part of the end face of the spool FIGS. 13 to 16 with the torsion bar removed.
Figure 18:
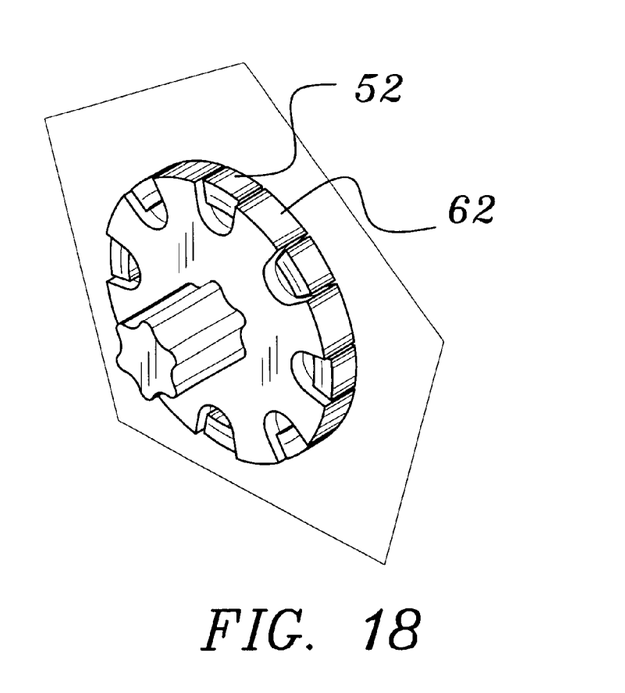
FIG. 18 is a view similar to FIG. 17 with the torsion bar present.

The retractor spool shown in FIGS. 13 to 18 is identical to that shown in FIGS. 4 to 9 and will not be described in detail. In FIGS. 14, 16 and 18 the torsion bar 56 is shown located within the retractor spool 28. As in the embodiment shown in FIGS. 1 to 9 the toothed portion 18 of the ratchet-coupling end 14 engages with the toothed inner surface of the bore 50 in the hub 48 of the ratchet wheel 44. At the opposite end of the spool 28 the disc 58 sits against the end flange 36 and the radial projections 62 are received in the spaces 54 between the axial protrusions 52 (see FIG. 18).

The torsion bar and retractor spool function in exactly the same way as described above in relation to the embodiment of FIGS. 1 to 9.

Figure 19:
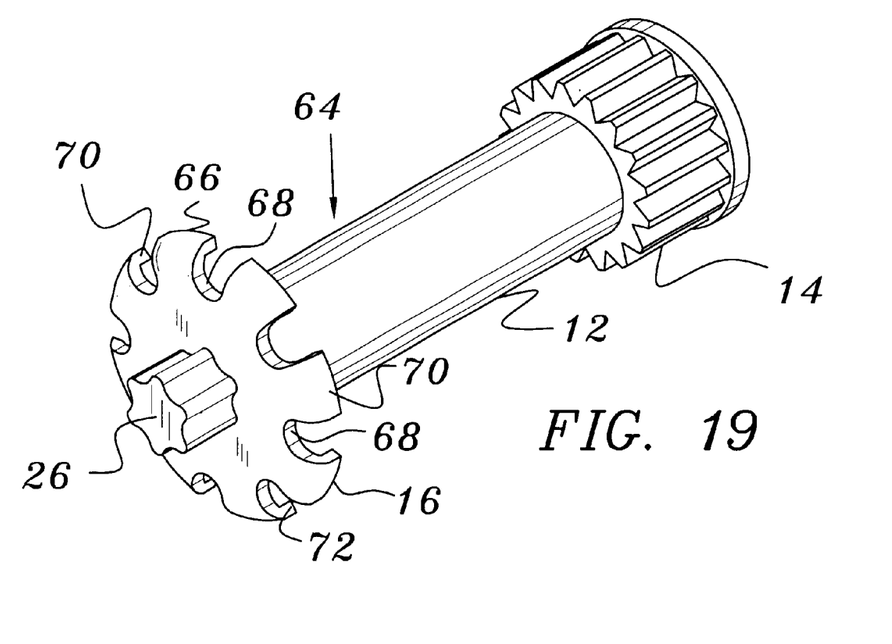
FIG. 19 is a perspective view of a third torsion bar in accordance with the invention looking from one end.
Figure 20:
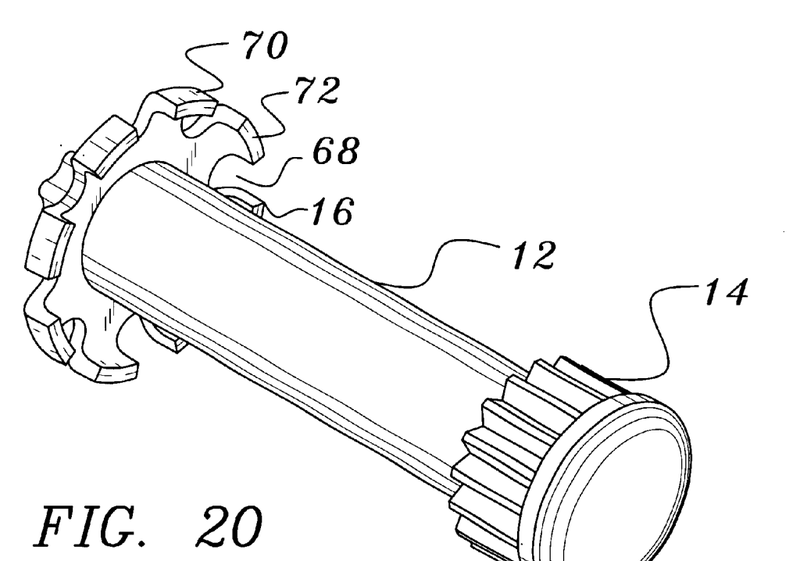
FIG. 20 is a perspective view of the torsion bar of FIG. 19 looking from the other end.
Figure 21:
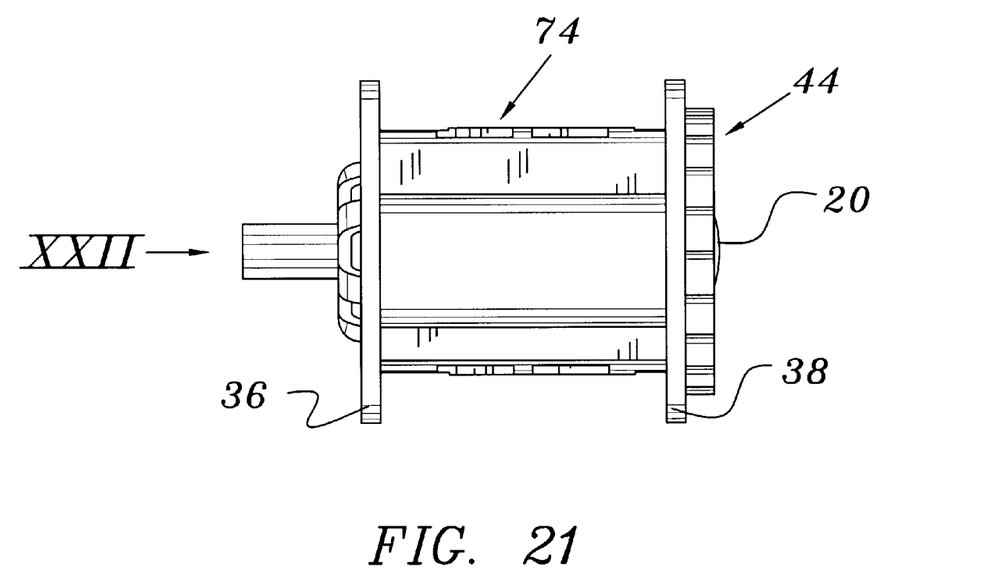
FIG. 21 is a side elevation of a seat belt retractor spool in accordance with the invention including the torsion bar of FIGS. 19 and 20.
Figure 22:
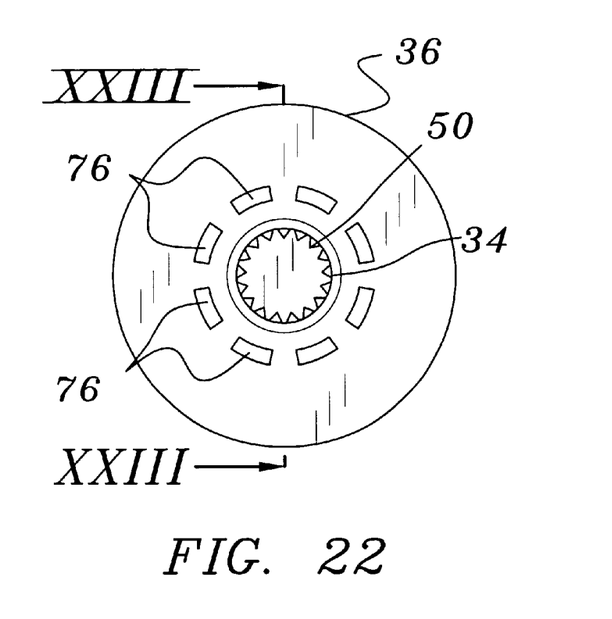
FIG. 22 is an end elevation of the spool of FIG. 21 looking in the direction of arrow XXII in FIG. 21 with the torsion bar removed.

A further torsion bar 64 in accordance with the invention is shown in FIGS. 19 and 20. Parts corresponding to parts in FIGS. 1 to 3 carry the same reference numerals. The torsion bar 64 shown in FIGS. 19 and 20 is substantially similar to that shown in FIGS. 1 to 3 and will not be described in detail.

As with the torsion bar of FIGS. 1 to 3 the torsion bar of FIGS. 19 and 20 comprises a body 12 having a ratchet-coupling end 14 and a spool-coupling end 16. The ratchet-coupling end 14 is identical to that of the torsion bar of FIGS. 1 to 3.

The spool-coupling end 16 comprises a disc 66 having a diameter substantially greater than the body 12 and the toothed portion 18 of the ratchet-coupling end 14. The disc 66 has eight cut out portions 68 cut out from the peripheral edge thereof. The cut out portion 68 defines between respective cut out portions 68, radial projections 70. The disc 66 has a larger diameter than the disc 58 in the torsion bar of FIGS. 10 to 12. The cut out portions 68 are deeper cut out portions than the cut out portion 60 in the torsion bar 56 as FIGS. 10 to 12.

The free end 72 of each radial projection 70 is bent toward the ratchet-coupling end 14 of the torsion bar 64. Thus each radial projection 70 comprises a radically extending part which curves into an axially extending part.

A retractor spool 74 is shown in FIGS. 21 to 25. The retractor spool 74 shown in FIGS. 21 to 25 is similar to that shown in FIGS. 4 to 9. Parts corresponding to parts in FIGS. 4 to 9 carry the same reference numerals.

The spool 74 is identical to that shown in FIGS. 4 to 9 with the exception that the protrusions 52 on the end flange 36 of the spool are replaced by angularity spaced recesses 76.

Figures 23, 24, 25:
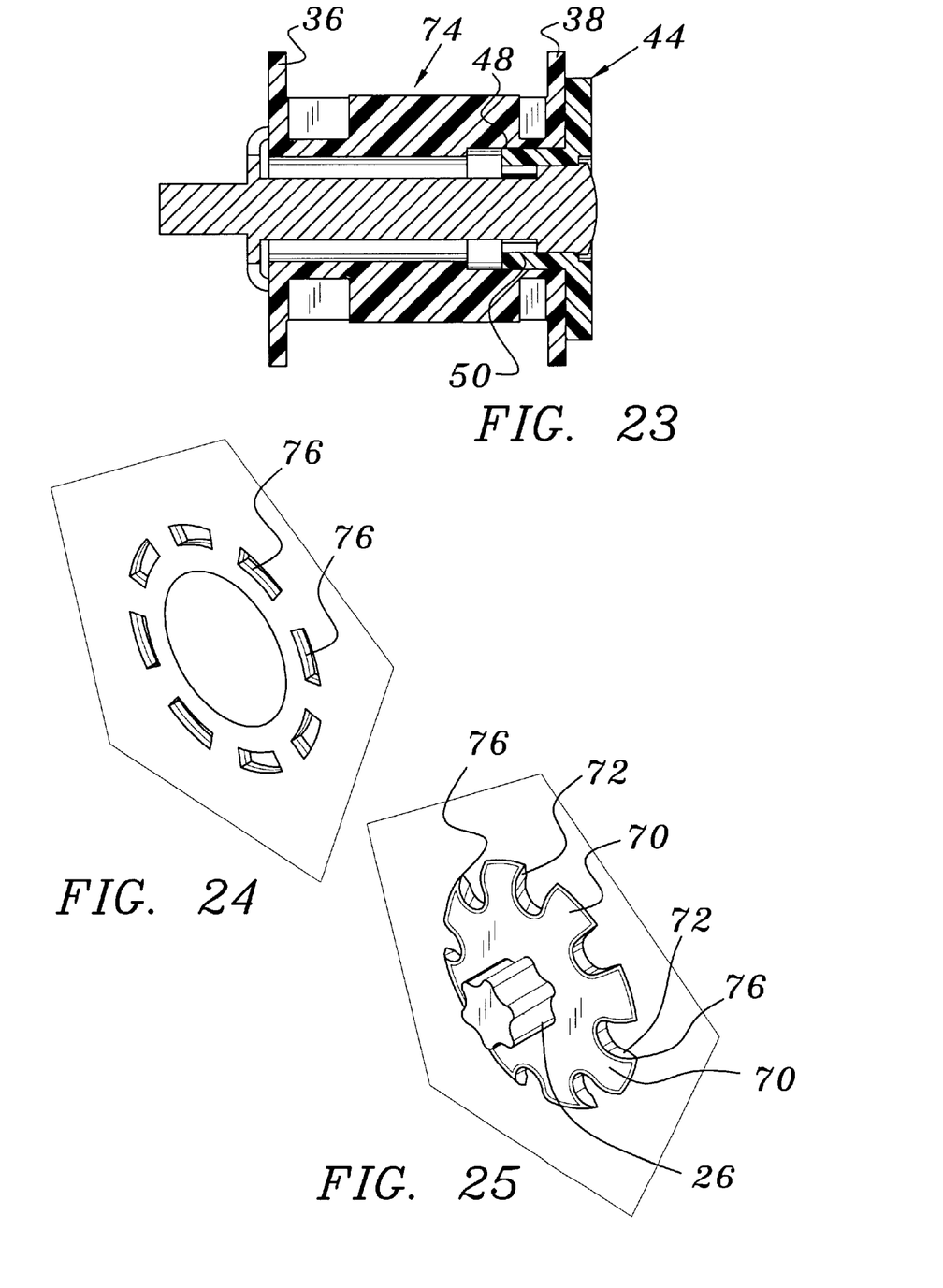
FIG. 23 is a section through the spool of FIGS. 21 and 22 taken on line XXIII—XXIII in FIG. 22 with torsion bar present.
FIG. 24 is a perspective view of part of the end face of the spool of FIGS. 21 and 23 with the torsion bar removed.
FIG. 25 is a view similar to FIG. 24 with the torsion bar present.

As shown in FIG. 25, when the torsion bar 64 of FIGS. 19 and 20 is located in the spool 74, the axially extending ends 72 of the radial projections 70 are received in the recesses 76 so as to couple the torsion bar 64 to the spool 74.

The torsion bar 64 and retractor spool 74 function in the same way as described above in the embodiment of FIGS. 1 to 9.

Figure 26:
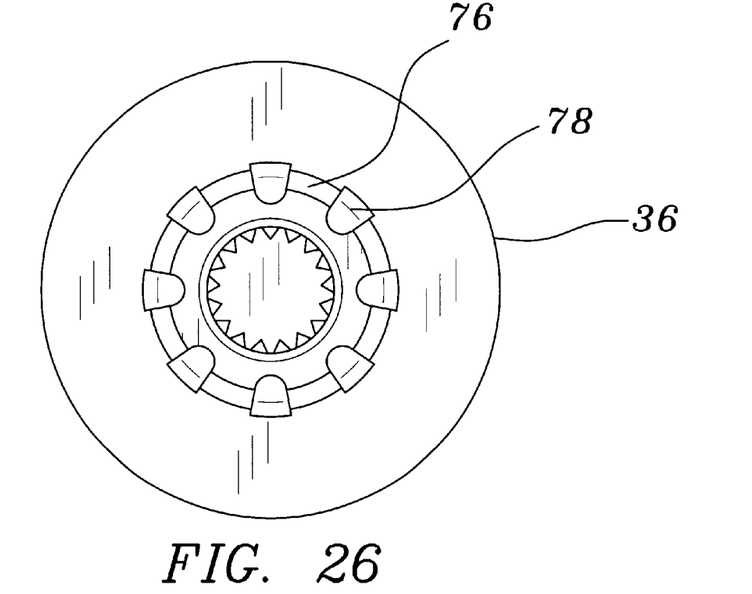
FIG. 26 is an end elevation of further spool in accordance with the invention.
Figure 27:
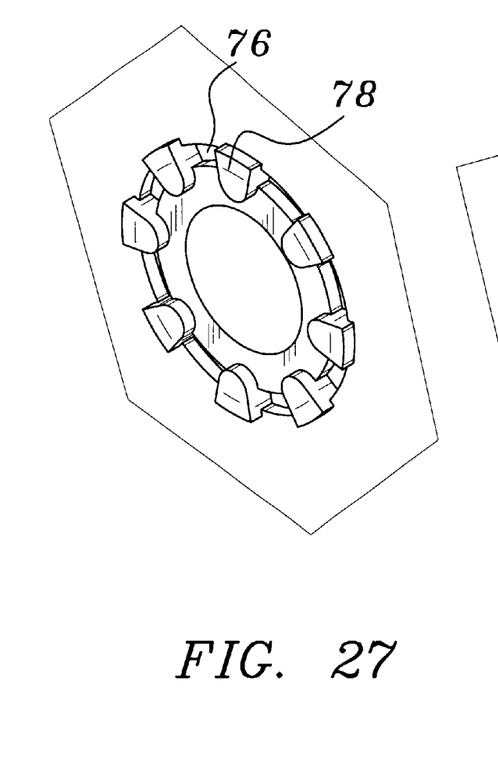
FIG. 27 is a perspective view of part of the end face of the spool of FIG. 26 with the torsion bar removed.
Figure 28:
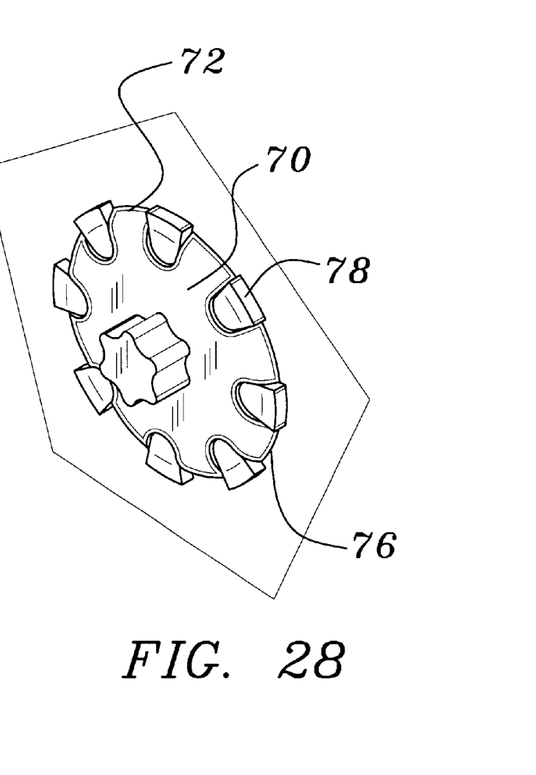
FIG. 28 is a view similar to FIG. 27 with the torsion bar of FIGS. 19 and 20 present.

FIGS. 26 to 28 show an alternative end flange 36 of the spool 74 shown in FIGS. 21 to 25. In FIG. 26, the end flange 36 has recesses 76 as in the embodiment of FIGS. 21 to 25 but additionally axial protrusions 78 are arranged between each recess 76. That arrangement serves further to secure and couples the torsion bar 64 to the spool 74.

Figure 29:
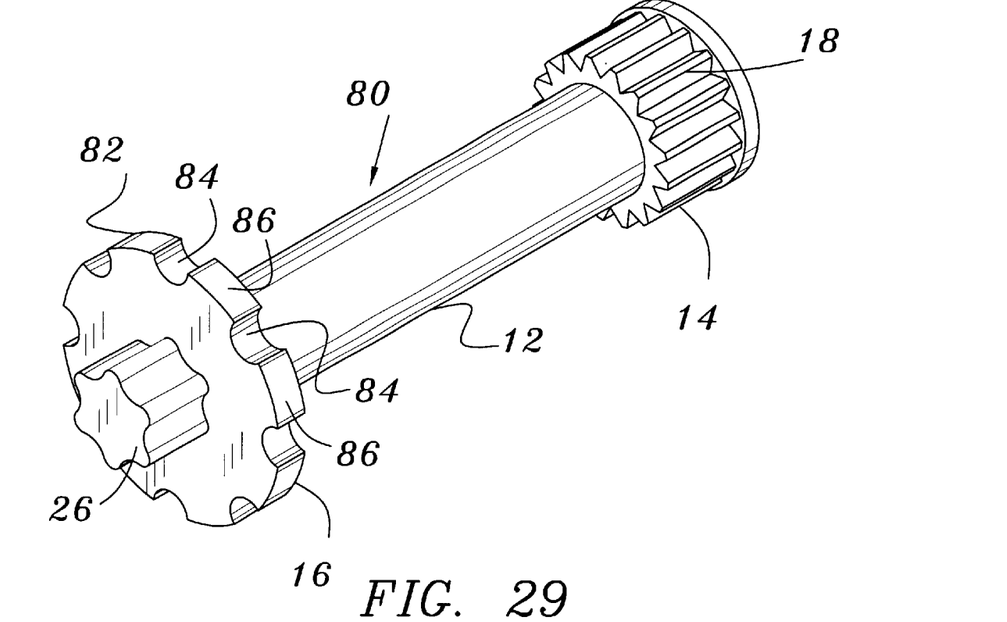
FIG. 29 is a perspective view of a fourth torsion bar in accordance with the invention looking from one end.
Figure 30:
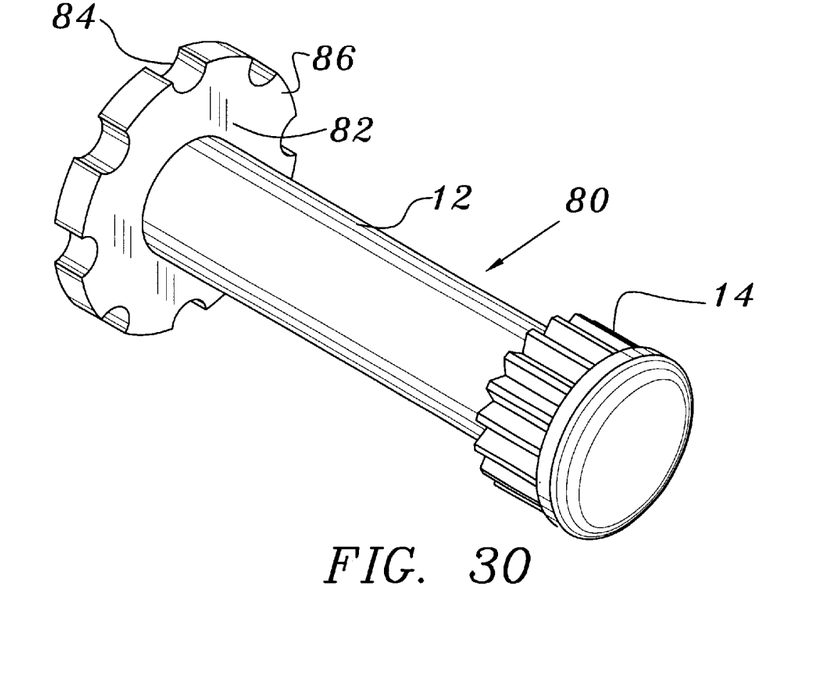
FIG. 30 is a perspective view of the torsion bar of FIG. 29 looking from the other end.
Figure 31:
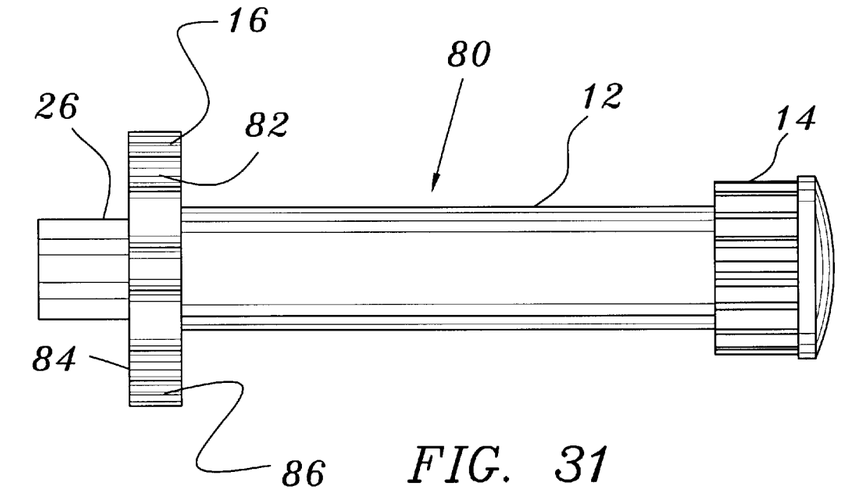
FIG. 31 is a side elevation of the torsion bar of FIGS. 29 and 30.

In FIGS. 29 to 31 a still further torsion bar 80 in accordance with the invention is shown. Parts corresponding to parts in FIGS. 1 to 3 carry the same reference numerals. The torsion bar 80 in FIGS. 29 to 31 is substantially similar to that shown in FIGS. 1 to 3 and will not be described in detail.

The torsion bar 80 comprises an elongate body 12 having a ratchet-coupling end 14 and a spool-coupling end 16. The ratchet-coupling end 14 is identical to that shown in FIGS. 1 to 3.

The spool-coupling end 16 comprises a disc 82 having a diameter substantially greater than that of the body 12 and toothed portion 18 of the ratchet-coupling end 14. The disc 82 has eight cut out portions 84 cut out form the peripheral edge of the disc. The cut out portions 84 form between respective pairs thereof radial projections 86. The cut outs 84 are not as deep as the cut outs 60 in the embodiment of FIGS. 10 to 12.

Figure 32:
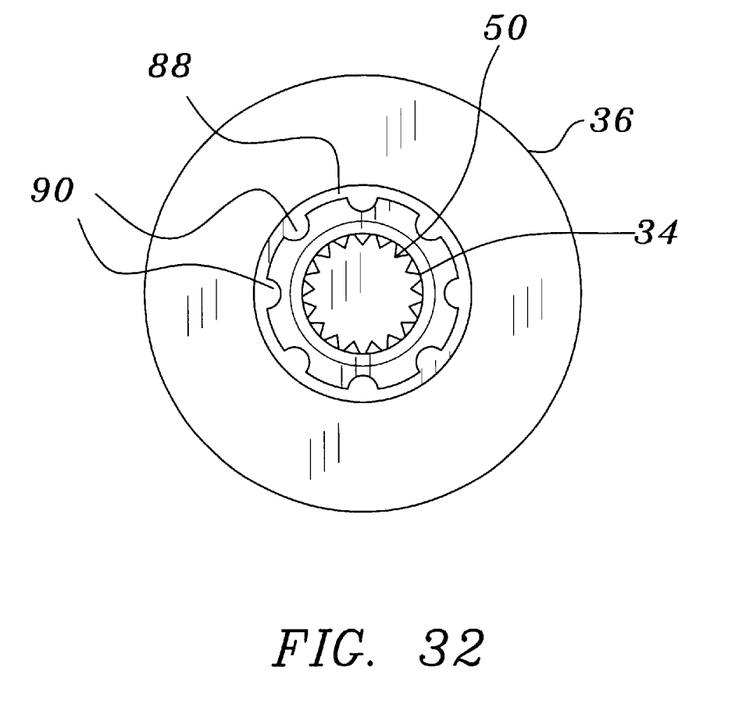
FIG. 32 is an end elevation of a still further embodiment of a seat belt retractor spool.
Figure 33:
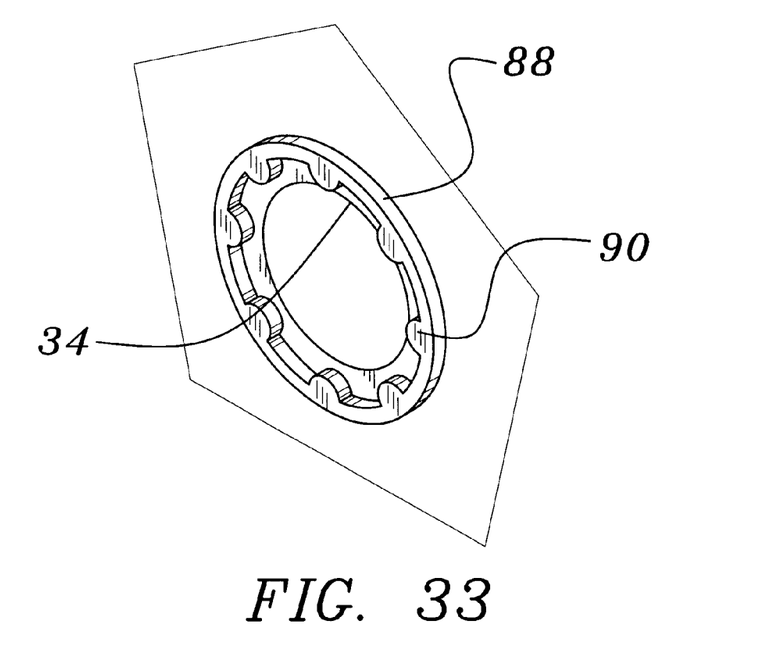
FIG. 33 is a perspective view of part of the end face of the spool of FIG. 32 with the torsion bar removed.
Figure 34:
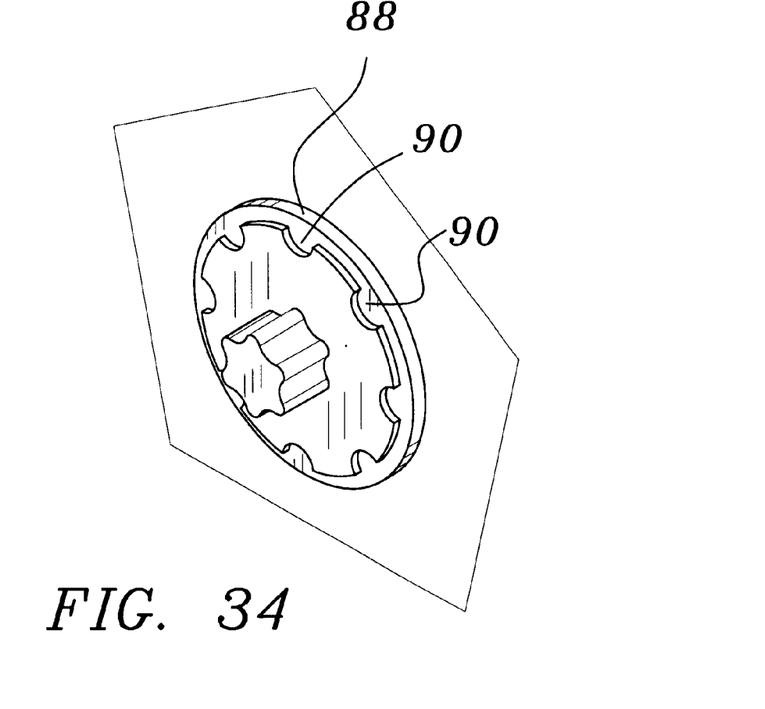
FIG. 34 is a view similar to FIG. 33 with the torsion bar of FIGS. 29 to 31 present.

FIGS. 32 to 34 show an end flange 36 of a spool similar to the spool of FIGS. 4 to 9. The flange 36 of FIGS. 32 to 34 replaces the axial protrusions 52 with an axially extending annular collar 88. The annular collar 88 includes eight inwardly projecting teeth 90, which are regularly angularity, spaced about the annular collar 88.

When the torsion bar of FIGS. 29 to 31 is located in the spool shown in FIGS. 32 to 34 the projections 86 are received in the spaces between the teeth 90 and the teeth 90 are received in the cut out 84 so as to couple the torsion bar 80 and the spool together.

Again the torsion bars and spool of FIGS. 29 to 34 functions in the same way as the bar and spool of FIGS. 1 to 9.

Many changes and modifications in the above described embodiments of the invention can, of course, be carried out without departing from the scope thereof. Accordingly, that scope is intended to be limited only by the scope of the appended claims.

We claim:

1. A seat belt retractor spool comprising a spool body having opposite end faces, a ratchet wheel arranged for rotation relative to the spool on one end face of the spool body and a torsion bar coupled to the ratchet wheel, the torsion bar extending through the spool body and having a spool-coupling formation on the end thereof spaced from the ratchet wheel, the spool-coupling formation comprising a projection projecting transversely from the end of the body, the end face of the spool body spaced from the ratchet wheel having a cooperating formation for cooperation with the spool-coupling formation on the torsion bar so as to couple the torsion bar to the spool body for rotation therewith.

2. The seat belt retractor spool according to claim 1 wherein the ratchet wheel coupling comprises a coupling surface formed in a peripheral portion of the torsion bar towards one end thereof and a cooperating recess in the ratchet wheel, which receives, said one end of the torsion bar.

3. A torsion bar for a seat belt retractor spool comprising an elongate body having a ratchet wheel coupling formed in a peripheral portion towards one end of the body and a spool-coupling formation comprising a projection projecting transversely from the other end of the body.

4. The torsion bar according to claim 3 wherein the ratchet wheel coupling on the torsion bar comprises a coupling surface formed in a peripheral portion of the body towards said one end.

5. The torsion bar according to claim 4 wherein the coupling surface in the torsion bar is a toothed portion.

6. The torsion bar according to claim 5 wherein the ratchet wheel comprises a recess having toothed inner wall for cooperation with the toothed portion on the torsion bar.

7. The torsion bar according to claim 3 used in a seat belt retractor spool comprising a spool body having opposite end faces, a ratchet wheel arranged for rotation relative to the spool on one end face of the spool body, the torsion bar being coupled to the ratchet wheel and extending through the spool body, the end face of the spool body spaced from the ratchet wheel having a cooperating formation for cooperation with the projection as to couple the torsion bar to the spool body for rotation therewith.

8. The torsion bar according to claim 7 wherein the spool-coupling formation comprises a plurality of radial projections.

9. The torsion bar according to claim 8 wherein the cooperating formation on the retractor spool comprises a plurality of radially spaced protrusions defining spaces therebetween for receiving respective radial projections.

10. The torsion bar according to claim 9 wherein the radial projections are regularly spaced about the longitudinal axis of the torsion bar and the protrusions on the spool are similarly spaced about the longitudinal axis of the spool.

11. The torsion bar according to claim 7 wherein the spool-coupling formation comprises a disc portion and a plurality of projections formed in one face of the disc portion.

12. The torsion bar according to claim 11 wherein the cooperating formation on the end face of the retractor spool comprises a depression, which is substantially the negative of the spool-coupling formation on the torsion bar.

13. The torsion bar according to claim 7 wherein the spool-coupling formation comprises a disc having cutouts formed about the periphery thereof to form a plurality of radial projections.

14. The torsion bar according to claim 7 wherein the spool-coupling formation comprises a plurality of radial projections, each radial projection including a radial portion extending outwardly from the end of the torsion bar and an axial portion extending from the end of the radial portion generally parallel to the axis of the torsion bar towards the end of the bar which couples with the ratchet wheel.

15. The torsion bar according to claim 14 wherein the cooperating formation on the end face of the retractor spool comprises a plurality of radially spaced recesses, each of which are arranged to receive at least part of the axial portion of a respective projection.

16. The torsion bar according to claim 15 wherein the cooperating formation further comprises protrusions arranged between respective recesses.

17. The torsion bar according to claim 7 wherein the ratchet wheel coupling end of the torsion bar has an end cap to retain the bar in place on the spool.

18. The torsion bar according to claim 17 wherein the end cap is formed by working over the end of the bar into an end cap by orbital riveting of the end.

* * * * *